United States Patent
Venham et al.

(10) Patent No.: US 7,371,807 B2
(45) Date of Patent: *May 13, 2008

(54) BLOCKED BIURETIZED ISOCYANATES

(75) Inventors: Lanny D. Venham, Oakdale, PA (US);
Kyli Martin, Bridgeville, PA (US);
Richard R. Roesler, Wexford, PA (US);
Myron W. Shaffer, New Cumberland, WV (US); Michael K. Jeffries, Follansbee, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 194 days.

This patent is subject to a terminal disclaimer.

(21) Appl. No.: 10/970,740

(22) Filed: Oct. 21, 2004

(65) Prior Publication Data

US 2006/0089479 A1     Apr. 27, 2006

(51) Int. Cl.
*C08G 18/80* (2006.01)
*C08G 18/10* (2006.01)
*C07C 273/02* (2006.01)
*C07C 275/08* (2006.01)

(52) U.S. Cl. ............... 528/45; 564/32; 564/33; 564/38; 252/182.2; 252/182.21; 528/49

(58) Field of Classification Search ............. 524/591, 524/839, 38; 252/182.2, 182.21; 428/422.8; 528/45, 49; 564/32, 33, 38
See application file for complete search history.

(56) References Cited

U.S. PATENT DOCUMENTS

| | | | |
|---|---|---|---|
| 3,903,127 A | 9/1975 | Wagner et al. | 260/453 AB |
| 3,976,622 A | 8/1976 | Wagner et al. | 260/77.5 AT |
| 4,173,567 A * | 11/1979 | Findeisen et al. | 548/216 |
| 4,220,749 A | 9/1980 | Reichmann et al. | 528/44 |
| 4,324,979 A | 4/1982 | Bewley et al. | 528/45 |
| 4,439,593 A | 3/1984 | Kelso et al. | 528/45 |
| 4,495,229 A | 1/1985 | Wolf et al. | 427/388.2 |
| 4,518,522 A | 5/1985 | Markusch et al. | 252/188.31 |
| 4,658,005 A * | 4/1987 | Gras et al. | 528/45 |
| 4,677,180 A | 6/1987 | Schmitt et al. | 528/45 |
| 4,788,262 A | 11/1988 | Markusch et al. | 525/457 |
| 5,071,937 A | 12/1991 | Potter et al. | 528/45 |
| 5,705,593 A | 1/1998 | Schmalstieg et al. | 528/45 |
| 5,780,541 A | 7/1998 | Mayenfels et al. | 524/590 |
| 5,849,855 A | 12/1998 | Usui et al. | 528/45 |
| 6,051,675 A | 4/2000 | Gras | 528/45 |
| 6,060,573 A | 5/2000 | König et al. | 528/45 |
| 6,133,397 A | 10/2000 | O'Connor et al. | 528/48 |
| 6,274,693 B1 | 8/2001 | Poth et al. | 528/45 |
| 6,368,669 B1 | 4/2002 | Hughes et al. | 427/385.5 |
| 6,583,216 B1 | 6/2003 | König et al. | 524/591 |
| 6,784,243 B2 | 8/2004 | Rische et al. | 524/591 |
| 7,074,852 B2 * | 7/2006 | Mazanek et al. | 524/840 |
| 7,087,676 B2 * | 8/2006 | Mazanek et al. | 524/591 |
| 2003/0109664 A1 | 6/2003 | Adams et al. | 528/44 |
| 2003/0236360 A1 | 12/2003 | Gurtler et al. | |
| 2004/0266969 A1 | 12/2004 | Mazanek et al. | |

FOREIGN PATENT DOCUMENTS

CA    2211025    8/1996

OTHER PUBLICATIONS

"Blocked Isocyanates in Coating," Potter et al, presented at the Water-Borne & Higher-Solids Coatings Symposium, New Orleans, Feb. 1986, pp. 1-24.

* cited by examiner

*Primary Examiner*—Rabon Sergent
*Assistant Examiner*—Benjamin Gillespie
(74) *Attorney, Agent, or Firm*—Noland J. Cheung; John E. Mrozinski, Jr.

(57) ABSTRACT

The present invention is directed to blocked biuret group-containing polyisocyanate compositions, wherein the blocking agent is of the formula:

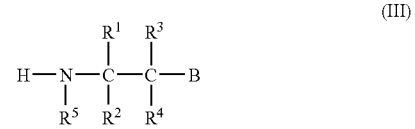

(III)

wherein $R^1$, $R^2$, $R^3$ and $R^4$ may be the same or different and represent a moiety selected from the group consisting of hydrogen, $C_1$-$C_6$-alkyl and $C_3$-$C_6$-cycloalkyl, $R^5$ represents a moiety selected from the group consisting of $C_1$-$C_{10}$-alkyl and $C_3$-$C_{10}$-cycloalkyl, and B is a group according to one of the following structural formulas

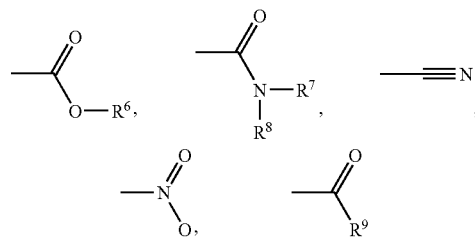

wherein each occurrence of $R^6$, $R^7$, and $R^8$ may be the same or different and represent a moiety selected from the group consisting of $C_1$-$C_6$-alkyl and $C_3$-$C_6$-cycloalkyl and $R^9$ is a moiety selected from the group consisting of hydrogen, $C_1$-$C_6$-alkyl and $C_3$-$C_6$-cycloalkyl.

5 Claims, No Drawings

BLOCKED BIURETIZED ISOCYANATES

BACKGROUND OF THE INVENTION

The biuretization of isocyanates is known in the art. U.S. Pat. Nos. 3,903,127 and 3,976,622 describe a variety of different biuretizing agents, including primary aliphatic amines. Canadian published application 2,211,025 describes the use of tertiary alcohols or a mixture of water and a tertiary alcohol to biuretize an isocyanate. Finally, U.S. Pat. No. 4,220,749 describes the use of secondary monoamines as biuretizing agents. All three references describe the use of hexamethylene diisocyanate as the starting isocyanate. U.S. Pat. No. 4,788,262 suggests biuretizing a trimer of hexamethylene diisocyanate, but only exemplifies a mixture of trimers and biurets (see also U.S. Pat. No. 6,133,397).

The use of polyisocyanates curing agents for coating compositions is also known, with polyisocyanates having isocyanate functionalities of 3 or higher being particularly preferred. U.S. Patent Application Publication 2003/0109664 describes the production of a higher functional polyisocyanate by biuretizing an isocyanaurate-group containing polyisocyanate. Among the starting isocyanates described is a trimer of hexamethylene diisocyanate. The biuretizing agent used is water. The application indicates that when compared to isocyanates biuretized with t-butanol or a mixture of t-butanol and water, the trimer-containing isocyanates biuretized with water only, exhibited improved color. The application also broadly suggests that the isocyanate groups of biuretized isocyanates can be blocked with alcohols, ketimines or oximes. Although the biuretized isocyanates described in the application are an improvement over the prior art biuretized isocyanates, it would be desirable to improve the gel content of coatings prepared from such isocyanates.

A wide variety of blocking agents are known in the art (see, e.g., "Blocked Isocyanates in Coatings," Potter et al, presented at the Water-Borne & Higher-Solids Coatings Symposium, New Orleans, February 1986. Among the blocking agents described are i) phenol, cresols and long aliphatic chain substituted phenols (such as isononylphenol), ii) amides (such as ε-caprolactam), iii) oximes (such as butanoneoxime), iv) active methylene group-containing compounds (such as malonates and aectoacetates) and v) sodium bisulfite. Various blocking agents are also described, e.g., in U.S. Pat. Nos. 4,324,879, 4,439,593, 4,495,229, 4,518,522, 4,667,180, 5,071,937, 5,705,593, 5,780,541, 5,849,855, 6,051,675, 6,060,573, 6,274,693, 6,368,669 and 6,583,216.

More recently, secondary amines such as N-benzyl-tert-butylamine (published European patent application 1,375,549, corresponding to U.S. patent application Ser. No. 10/459,033, filed on Jun. 10, 2003) and 3-tert-butylamino methyl proprionate (U.S. patent application Ser. No. 10/874,716, filed Jun. 23, 2004) have been described as useful blocking agents.

DESCRIPTION OF THE INVENTION

In one embodiment, the present invention is directed to a blocked biuret group-containing polyisocyanate composition having a blocked isocyanate functionality of at least 4 prepared by a process comprising
A) reacting a polyisocyanate adduct which
   a) is prepared from an aliphatic and/or cycloaliphatic diisocyanate
   b) has an isocyanate functionality of at least 2.5 and
   c) which contains isocyanurate groups, with a biuretizing agent to incorporate biuret groups into said polyisocyanate, and
B) reacting the biuret-containing polyisocyanate with a blocking agent of the formula:

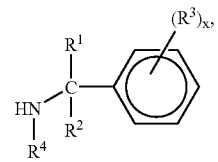

(II)

wherein $R^1$, $R^2$, $R^3$ may be identical or different and represent a moiety selected from the group consisting of hydrogen, $C_1$-$C_4$-alkyl and $C_3$-$C_6$-cycloalkyl,
$R^4$ represents a moiety selected from the group consisting of $C_1$-$C_4$-alkyl, $C_6$-$C_{10}$-cycloalkyl or $C_7$-$C_{14}$-aralkyl, and
x represents a number of from 1 to 5.

In another embodiment, the invention is directed to a blocked biuret group-containing polyisocyanate composition having a blocked isocyanate functionality of at least 4 prepared by a process comprising
A) reacting a polyisocyanate adduct which
   a) is prepared from an aliphatic and/or cycloaliphatic diisocyanate
   b) has an isocyanate functionality of at least 2.5 and
   c) which contains isocyanurate groups,
with a biuretizing agent to incorporate biuret groups into said polyisocyanate, and
B) reacting the biuret-containing polyisocyanate with a blocking agent of the formula: the formula:

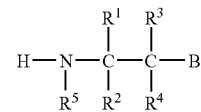

(III)

wherein $R^1$, $R^2$, $R^3$ and $R^4$ may be the same or different and represent a moiety selected from the group consisting of hydrogen, $C_1$-$C_6$-alkyl and $C_3$-$C_6$-cycloalkyl,
$R^5$ represents a moiety selected from the group consisting of $C_1$-$C_{10}$-alkyl and $C_3$-$C_{10}$-cycloalkyl, and
B is a group according to one of the following structural formulas

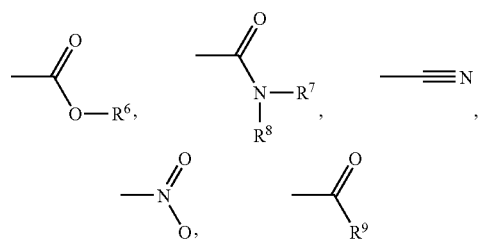

wherein each occurrence of $R^6$, $R^7$, and $R^8$ may be the same or different and represent a moiety selected from the group consisting of $C_1$-$C_6$-alkyl and $C_3$-$C_6$-cycloalkyl and $R^9$ is a moiety selected from the group consisting of hydrogen, $C_1$-$C_6$-alkyl and $C_3$-$C_6$-cycloalkyl.

Suitable starting polyisocyanates for preparing the polyisocyanates of the present invention are polyisocyanate adducts which a) are prepared from aliphatic and/or cycloaliphatic diisocyanates, preferably aliphatic diisocyanates and more preferably 1,6-hexamethylene diisocyanate;

b) have an average isocyanate functionality of at least 2.5, preferably at least 2.8 and more preferably at least 3.0; and c) contain isocyanurate groups.

The starting polyisocyanate adducts preferably have an NCO content of 10 to 25% by weight, more preferably 12 to 25% by weight and most preferably 15 to 25% by weight; and preferably have an upper limit for the functionality of 8, more preferably 7 and most preferably 6. The starting material to prepare the polyisocyanate adducts preferably contains at least 70% by weight, more preferably at least 80% by weight and most preferably at least 90% by weight of an aliphatic diisocyanate, and most preferably 1,6-hexamethylene diisocyanate.

Starting polyisocyanate adducts containing isocyanurate groups are known and may be prepared in accordance with the teachings of U.S. Pat. No. 4,324,879, herein incorporated by reference. In the present invention, these adducts are generally preferred as the starting materials. Useful examples of such polyisocyanate adducts containing isocyanurate groups are trimers formed from an aliphatic and/or cycloaliphatic diisocyanate. Trimers of aliphatic diisocyanates, such as the trimer of 1,6-hexamethylene diisocyanate which is sold under the tradename Desmodur N3390, from Bayer Polymers LLC, are most preferred.

Substantially any aliphatic and/or cycloaliphatic diisocyanate can be used to form the starting polyisocyanate adduct. Useful diisocyanates include, without limitation, 1,6-hexamethylene diisocyanate, bis-cyclohexyl diisocyanate, 1,4-cyclohexyl diisocyanate, bis-(4-isocyanatocyclohexyl)-methane, 3-isocyanatomethyl-3,5,5-trimethylcyclohexylisocyanate ("isophorone diisocyanate") and the like.

To prepare the polyisocyanates containing biuret groups according to the present invention the starting polyisocyanate adducts are reacted in the presence of a biuretizing agent of the type known in the art. Such biuretizing agents include water, secondary monoamines and tertiary alcohols. The use of water as a biuretizing agent is described in U.S. Pat. Nos. 3,124,605 and 3,903,127, the disclosures of which are herein incorporated by reference.

The preparation of biuretized isocyanates using secondary monoamines is described in U.S. Pat. No. 4,220,749, the disclosure of which is hereby incorporated by reference. In general, the secondary amines are of the general formula: $(R_1)(R_2)NH$, where $R_1$ and $R_2$ may be the same or different and represent an aliphatic hydrocarbon radical containing from 1 to 20 carbon atoms. Specific useful secondary monoamines include dimethylamine, diethylamine, dipropylamine, dibutylamine, bis-(2-ethylhexyl)-amine. The isocyanate and amine are reacted at an isocyanate to amine equivalent ratio of from about 4:1 to about 14:1 to incorporate biuret groups into said polyisocyanate. The reaction is carried out at a temperature of from about 0 to 140° C., preferably 60 to 160° C. and more preferably 70 to 140° C.

Finally, the use of tertiary alcohols and mixtures of tertiary alcohols and water are described in Canadian published application 2,211,025, the disclosure of which is hereby incorporated by reference.

The resulting biuret-group containing polyisocyanate has an isocyanate functionality of at least 4, preferably at least 4.5 and more preferably at least 4.8 and an NCO content of from about 8 to about 24% by weight, preferably from about 10 to about 22% by weight and more preferably from about 10 to about 20% by weight, based on the weight of the polyisocyanate. The resulting polyisocyanates preferably have a maximum functionality of 10, more preferably 8 and most preferably 7. The products can be suitably reduced in solvent for use.

The molecular weight of the product is calculated by GPC using polystyrene as the standard. The resulting biuret-group containing polyisocyanate has a number average molecular weight of from about 500 to about 10,000, preferably from about 500 to about 5,000 and most preferably from about 500 to about 3,000.

Using the process of the invention, the biuret group-containing polyisocyanate can be prepared either continuously or batchwise.

The products obtained by the process are then blocked with a blocking agent. In the first embodiment, the blocking agent is a compound of the formula:

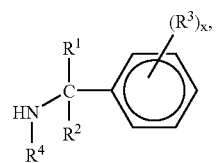

(II)

wherein $R^1$, $R^2$, $R^3$ may be identical or different and represent a moiety selected from the group consisting of hydrogen, $C_1$-$C_4$-alkyl and $C_3$-$C_6$-cycloalkyl, $R^4$ represents a moiety selected from the group consisting of $C_1$-$C_4$-alkyl, $C_6$-$C_{10}$-cycloalkyl or $C_7$-$C_{14}$-aralkyl, and x represents a number of from 1 to 5. Preferred are unsymmetrical substituted secondary amines (i.e. secondary amines having two different substituents). N-benzyl-tert-butylamine is the most preferred compound.

In the second embodiment, the blocking agent is a compound of the formula:

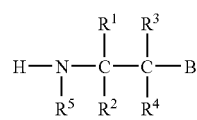

(III)

wherein $R^1$, $R^2$, $R^3$ and $R^4$ may be the same or different and represent a moiety selected from the group consisting of hydrogen, $C_1$-$C_6$-alkyl and $C_3$-$C_6$-cycloalkyl, $R^5$ represents a moiety selected from the group consisting of $C_1$-$C_{10}$-alkyl and $C_3$-$C_{10}$-cycloalkyl, and B is a group according to one of the following structural formulas

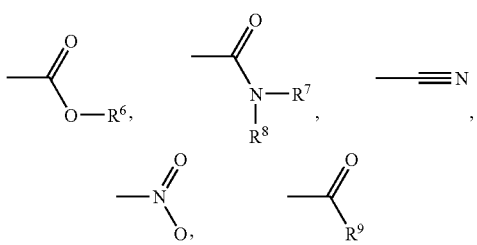

wherein each occurrence of $R^6$, $R^7$, and $R^8$ may be the same or different and represent a moiety selected from the group consisting of $C_1$-$C_6$-alkyl and $C_3$-$C_6$-cycloalkyl and $R^9$ is a moiety selected from the group consisting of hydrogen, $C_1$-$C_6$-alkyl and $C_3$-$C_6$-cycloalkyl. The blocking agents of the formula (III) can be prepared, for example, by reaction of primary amines on compounds with activated carbon-carbon double bonds, such as are described, for example, in Organikum, 19th edition, Deutscher Verlag der Wissenschaften, Leipzig, 1993, pages 523 to 525. In this reaction, a primary amine reacts selectively with a carbon-carbon double bond to give a secondary, unsymmetric amine. Substances which can be interpreted as reaction products in the sense described above of sterically hindered primary alkylamines, such as, for example, sec-butylamine, tert-butylamine, optionally alkyl-substituted cyclohexylamine, iso-propylamine, cyclopropylamine, the branched or cyclic isomers of pentyl-, hexyl-, heptyl-, octyl- and nonylamine or benzylamine, and compounds with an activated carbon-carbon double bond, such as, for example, α,β-unsaturated carboxylic acid esters, α,β-unsaturated N,N-carboxylic acid dialkylamides, nitroalkenes, aldehydes and ketones, are preferably used as blocking agents of the formula (III). Substances which can be interpreted as addition products of primary amines on alkyl esters of acrylic, methacrylic and crotonic acid, such as methyl methacrylate, iso-norbornyl methacrylate, ethyl methacrylate, n-propyl methacrylate, iso-propyl methacrylate, n-butyl methacrylate, iso-butyl methacrylate, 2-ethylhexyl methacrylate, methyl acrylate, ethyl acrylate, n-propyl acrylate, iso-propyl acrylate, iso-norbornyl acrylate, n-butyl acrylate, tert-butyl acrylate, iso-butyl acrylate, 2-ethylhexyl acrylate, crotonic acid methyl ester, crotonic acid ethyl ester, crotonic acid propyl ester, are particularly preferably used.

Substances which are addition products of tert-butylamine or iso-propylamine or cyclohexylamine on to methyl or ethyl or propyl or iso-propyl or n-butyl or iso-butyl or tert-butyl esters of acrylic or methacrylic or crotonic acid are preferably used. Substances which are either the addition product of tert-butylamine on to methyl acrylate or the addition product of tert-butylamine on to methyl methacrylate or the addition product of tert-butylamine on to tert-butyl acrylate are particularly preferably used.

The preparation of the blocking agents of formula (III) can take place in a suitable, preferably polar solvent. The desired products can optionally be separated from the solvent and/or by-products by distillation or by extraction and then reacted with the polyisocyanates. However, it is also possible to carry out the reaction in a suitable lacquer solvent and to use the reaction mixture obtained directly for the preparation of the blocked polyisocyanates. Blocking agents of the formula (III) which have been prepared by a route other than that described above, for example by transesterification of an ethyl ester of the formula (III) into a methyl ester, can of course also be used.

In general, the reaction between the polyisocyanate adduct and the blocking agent is conducted at a temperature of less than 120° C. and preferably at a temperature of from 40° C. to 80° C. Known catalysts are added in order to maintain a slight exotherm. The reaction takes from about 2 hours to about 6 hours after catalyst addition. Ideally the ratio of materials would be 1 equivalent of blocking agent for each isocyanate equivalent. In practice the ratio is 1±0.05 equivalents of blocking agent pre isocyanate equivalent.

The products of the invention are particularly suitable as curing agents in coating compositions, especially in automotive coatings. The coating compositions of this invention generally contain a film forming binder which comprises an isocyanate-reactive oligomer or polymer or dispersed gelled polymer, and the blocked biuret group-containing polyisocyanate curing agent as described above.

As indicated above, the coating composition is particularly suited for use as a clear coat in automotive refinishing and finishing but can be pigmented with conventional pigments and used as a monocoat or as basecoat or even as an undercoat such as a primer or sealer. These coatings may also be used in nonautomotive applications such as in industrial and architectural applications.

It has also been found that coatings prepared form the blocked isocyanates of the invention exhibit improved cure as shown by increased gel content at lower cure temperatures when compared to similar products made from other blocking agents. In addition, coatings form the blocked isocyanates of the present invention exhibit improved scratch and mar resistance.

In the examples which follow, all parts and per cents are by weight unless otherwise indicated and the following materials were used:

DESMO870—Desmophen A 870 BA—a 70% solids hydroxyl functional polyacrylate in n-butyl acetate having an OH number of 97, a viscosity of 3500 mPa·s at 23° C. and an equivalent weight of 576, available from Bayer MaterialScience LLC.

DESMO2388—Desmophen LS2388—an 80% solids hydroxyl functional polyester in n-butyl acetate having an OH number of about 125, a viscosity of 3500 mPa·s at 23° C. and an equivalent weight of about 447, available from Bayer MaterialScience LLC.

Bay OL—Baysilone OL-17—a 10% polyether-modified methyl polysiloxane in PMA (propylene glycol monomethyl ether acetate, available from Borchers and sold as a flow modifier.

T-12—Dabco T-12—10% dibutyltin dilaurate in n-butyl acetate—available from Air Products.

T-928—Tinuvin 928—20% hydroxyphenyl benzotriazole based UV-absorber in n-butyl acetate available from Ciba Specialty Chemicals.

CGL—CGL-052L2—an hydroxyl functional triazine based hindered amine light absorber from Ciba Specialty Chemicals.

T-400—Tinuvin 400—an hydroxyl phenyl triazine class UV absorber containing 15% methoxypropanol as solvent, available from Ciba Specialty Chemicals n-BA/PMA/EEP—a 4:5:6 blend of n-butyl acetate, PM acetate (CAS#108-65-6, also known as propylene glycol monomethyl ether acetate) and Ektapro EEP from Eastman (CAS#763-69-9, also known as ethyl 3-etholypropionate).

Polyisocyanate Solution A—Into a 500 milliliter round bottom flask fitted with stirrer, nitrogen inlet, thermocouple and heater was added 200 parts (1.08 eq) of Desmodur TP LS 2294 polyisocyanate (an trimerized isocyanate based on hexane diisocyanate having an NCO content of 23% at 100% solids and a viscosity of 1000 cps at 25° C. available from Bayer MaterialScience LLC), 50 parts of butyl acetate, 0.10 parts of dibutyl phosphate catalyst and 1.43 parts (0.08 eq) of distilled water and mixed until homogenous. The reaction was heated to 140° C. and held there for eight hours. At the end of the heating period, the reaction was cooled to room temperature. The isocyanate content was 15.28% NCO (14.22% theoretical). The viscosity at 25° C. was 603 cps. Functionality was approximately five isocyanates per molecule.

Blocked ISO 1 (comparative)—A one liter round bottom flask fitted with a stirrer, nitrogen inlet, thermocouple, heater and addition funnel was charged with 350.0 parts (1.80 eq) of Desmodur N 3300 (a solvent-free hexane diisocyanate trimer having an NCO content of about 22% by weight and a viscosity of about 2500 mPa·s at 25° C., available from Bayer MaterialScience LLC) and 212.4 parts of butyl acetate. Stirring of the flask contents was started and a dropping funnel was charged with 287.3(1.80 eq) parts of 3-tert-butylamino methyl propionate. The 3-tert-butylamino methyl propionate (BAMP) was dripped slowly into the reaction flask over a sixty minute period. The temperature of the reaction mass rose due to the exothermic reaction. The temperature was maintained below 60° C. during the addition period. After all of the 3-tert-butylamino methyl propionate was added, the heating mantle was turned on and the temperature maintained at 60° C. After one to two hours at 60° C., no free isocyanate could be detected by IR. At this point the heating was turned off, and the contents were allowed to cool. The viscosity of the final product at 25° C. was 841 cps. The density was 8.826 lbs/gal. The calculated equivalent weight was 471 g/equivalent.

Blocked ISO 2—A one liter round bottom flask fitted with a stirrer, nitrogen inlet, thermocouple, heater and addition funnel was charged with 483.64 parts (1.56 eq) of Polyisocyanate Solution A and 112.27 parts of butyl acetate. Stirring of the flask contents was started and a dropping funnel was charged with 150.0 parts (0.92 eq) of 3-tert-butylamino methyl propionate. The 3-tert-butylamino methyl propionate (BAMP) was dripped slowly into the reaction flask over a sixty minute period. The temperature of the reaction mass rose due to the exothermic reaction. The temperature was maintained below 60° C. during the addition period. After all of the 3-tert-butylamino methyl propionate was added, the heating mantle was turned on and the temperature maintained at 60° C. After one to two hours at 60° C., no free isocyanate could be detected by IR. At this point the heating was turned off, and the contents were allowed to cool. The viscosity of the final product at 25° C. was 1,722 cps. The density was 8.9 lbs/gal. The calculated equivalent weight was 512 g/equivalent.

Blocked ISO 3 (comparative)—A one liter round bottom flask fitted with a stirrer, nitrogen inlet, thermocouple, heater and addition funnel was charged with 177.04 parts (0.91 eq) of Desmodur N 3300, 29.91 parts of PM acetate and 65.53 parts of xylene. Stirring of the flask contents was started and a dropping funnel was charged with 115.0 parts (0.92 eq) of t-butylbenzylamine. The t-butylbenzylamine (BEBA) was dripped slowly into the reaction flask over a thirty minute period. The temperature of the reaction mass rose due to the exothermic reaction. The temperature was maintained below 60° C. during the addition period. After all of the t-butylbenzylamine was added, the heating mantle was turned on and the temperature maintained at 60° C. After one to two hours at 60° C., no free isocyanate could be detected by IR. At this point the heating was turned off, and 46.73 parts of 2-butanol were added to the flask and the contents were allowed to cool. The viscosity of the final product at 25° C. was 883 cps. The density was 8.9 lbs/gal. The calculated equivalent weight was 512 g/equivalent.

Blocked ISO 4—A one liter round bottom flask fitted with a stirrer, nitrogen inlet, thermocouple, heater and addition funnel was charged with 255.08 parts (0.91 eq) of Polyisocyanate Solution and 19.8 parts of butyl acetate. Stirring of the flask contents was started and a dropping funnel was charged with 150.0 parts (0.92 eq) of t-butylbenzylamine. The t-butylbenzylamine (BEBA) was dripped slowly into the reaction flask over a thirty minute period. The temperature of the reaction mass rose due to the exothermic reaction. The temperature was maintained below 60° C. during the addition period. After all of the t-butylbenzylamine was added, the heating mantle was turned on and the temperature maintained at 60° C. After one to two hours at 60° C., no free isocyanate could be detected by IR. At this point the heating was turned off, and 2-butanol (47.21 g) was added to the flask and the contents were allowed to cool. The viscosity of the final product at 25° C. was 7,220 cps. The density was 8.6 lbs/gal. The calculated equivalent weight was 519 g/equivalent.

Table 1 below sets forth the coating compositions tested and Table 2 sets forth the test results. The compositions were applied using a Binks 95 type siphon gun to a wet film build of approximately 4 mils. After flashing for 15 minutes, the panels were cured according to their desired temperature ranges.

The tests conducted were the following:

Pendulum Hardness: Measured on a Konig type, Erichsen Model 299-300 with approximately 2 mil DFT of clearcoat on a 3"×6" glass panel Gel Content: Free films of approximately one inch square were placed in a pre-weighed 100-mesh stainless steel net screen and re-weighed followed by placement in a heated glass flask and refluxing with acetone at 60° C. for 7 hours. The screens were removed from the acetone, rinsed with acetone and dried for 16 hours at 40° C. before being re-weighed. The difference in weight of the free film after refluxing from the original weight was then used to determine the gel content.

Tensile Strength: Measured according to ASTM D-2370: Grip separation of 2", crosshead speed of 1 in/min, 6"×0.5" cutting die. Elongation measured at break point without extensiometers.

TABLE 1

Formulations - all numbers in the ingredient rows are parts by weight

| Raw Material | Coating 1 | Coating 2 | Coating 3 | Coating 4 |
|---|---|---|---|---|
| Desmo870 | 167.38 | 146.67 | 167.06 | 151.03 |
| Desmo2388 | 111.39 | 92.94 | 111.18 | 95.70 |
| Bay OL | 4.21 | 4.18 | 4.23 | 4.15 |
| T-12 | 20.31 | 18.16 | 20.43 | 18.84 |
| Tinuvin 928 | 20.31 | 18.16 | 20.43 | 18.84 |

TABLE 1-continued

Formulations - all numbers in the ingredient rows are parts by weight

| Raw Material | Coating 1 | Coating 2 | Coating 3 | Coating 4 |
|---|---|---|---|---|
| CGL-052L2 | 6.77 | 6.05 | 6.18 | 6.28 |
| Tinuvin 400 | 4.78 | 4.27 | 4.81 | 4.43 |
| n-BA/PMA/EEP | 240.02 | 297.65 | 222.10 | 272.07 |
| Blocked Iso 1 | 266.69 | | | |
| Blocked Iso 2 | | 248.30 | | |
| Blocked Iso 3 | | | 289.56 | |
| Blocked Iso 4 | | | | 259.47 |

TABLE 2

Film Testing Results

| System | Pendulum Hardness (s) | Gel Content (%) | Tensile (psi) |
|---|---|---|---|
| Coating 1 | 137 | 94.43 | 2534 |
| Coating 2 | 245 | 94.45 | 3170 |
| Coating 3 | 69 | 93.6 | 2293 |
| Coating 4 | 87 | 93.81 | 3536 |

What is claimed is:

1. A blocked biuret group-containing polyisocyanate composition having a blocked isocyanate functionality of at least 4 prepared by a process comprising A) reacting a polyisocyanate adduct which a) is prepared from an aliphatic and/or cycloaliphatic diisocyanate, b) has an isocyanate functionality of at least 2.5 and c) which contains isocyanurate groups, with a biuretizing agent to incorporate biuret groups into said polyisocyanate, and B) reacting the biuret-containing polyisocyanate with a blocking agent of the formula:

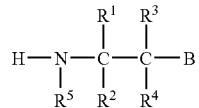

wherein $R^1$, $R^2$, $R^3$ and $R^4$ may be the same or different and represent a moiety selected from the group consisting of hydrogen, $C_1$-$C_6$-alkyl and $C_3$-$C_6$-cycloalkyl, $R^5$ represents a moiety selected from the group consisting of $C_1$-$C_{10}$-alkyl and $C_3$-$C_{10}$-cycloalkyl, and B is a group according to one of the following structural formulas

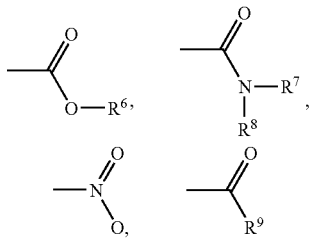

wherein each occurrence of $R^6$, $R^7$, and $R^8$ may be the same or different and represent a moiety selected from the group consisting of $C_1$-$C_6$-alkyl and $C_3$-$C_6$-cycloalkyl and $R^9$ is a moiety selected from the group consisting of hydrogen, $C_1$-$C_6$-alkyl and $C_3$-$C_6$-cycloalkyl.

2. The composition of claim 1, wherein said adduct has an isocyanate functionality of at least 2.8.

3. The composition of claim 2, wherein said adduct has an isocyanate functionality of at least 3.0 and an isocyanate functionality of no more than 8.

4. The composition of claim 2, wherein component A)a) is an aliphatic diisocyanate.

5. The composition of claim 2, wherein said biuretizing agent is selected from the group consisting of water, secondary amines and tertiary alcohols.

* * * * *